Patented Feb. 6, 1951

2,540,238

UNITED STATES PATENT OFFICE 2,540,238

PURIFICATION AND RECOVERY OF STREPTOMYCIN

William A. Bittenbender, Plainfield, and Robert D. Babson, Rahway, N. J., assignors to Merck & Co., Inc., Rahway, N. J., a corporation of New Jersey No Drawing. Application June 8, 1946, Serial No. 675,322

4 Claims. (Cl. 260—210)

This invention relates to processes for preparing streptomycin and particularly to new procedures for removing impurities from aqueous solutions containing streptomycin.

The production of streptomycin by cultivation of strains of the organism *Actinomyces griseus* in suitable culture medium was first reported by Schatz, Bugie, and Waksman in Proceedings of the Society for Experimental Biology and Medicine 55, 66–69 (1944). According to this publication, the streptomycin was recovered from the culture broth by adsorbing it on activated charcoal at neutrality and eluting with dilute mineral acid followed by neutralizing the eluate, drying, and treating to remove inorganic matter.

In accordance with an improved procedure of one of our colleagues A. Walti, which is fully disclose in his pending application Serial No. 577,143, filed February 9, 1945, now Patent No. 2,481,267 issued September 6, 1949, streptomycin, adsorbed on activated charcoal, is eluted by treating a low normality aqueous-alcoholic solution of a lower aliphatic carboxylic acid. In this procedure, the difficulties and losses encountered in separating inorganic salts are overcome.

In practice it is found that in both of the procedures referred to above excessive amounts of organic impurities are adsorbed and eluted together with the streptomycin. These impurities hamper subsequent working up of the streptomycin for therapeutic use by reducing the potency of and imparting toxicity to the product.

It is now discovered, in accordance with the present invention, that considerable amounts of organic impurities can be removed and a product of increased potency can be produced in better yield by treating streptomycin in aqueous solution at an alkaline pH, i. e. pH 8 to 11, with activated charcoal, filtering off the charcoal-streptomycin adsorbate, washing the filter cake with water until the washings are substantially neutral (pH 7.0–7.5), and then eluting streptomycin from the charcoal with dilute mineral acid or lower aliphatic carboxylic acid in accordance with procedures above mentioned. The alkaline conditions maintained during the charcoal treatment cause streptomycin to be adsorbed more rapidly and completely than at neutrality, and at the same time materially reduce the amount of impurities adsorbed.

Various aqueous streptomycin solutions can be treated in this manner including original filtered streptomycin culture broth, partially purified streptomycin solutions, and aqueous solutions of streptomycin made up from low potency solid concentrates.

It is further discovered, in accordance with the present invention, that superior results are achieved in the recovery of high potency streptomycin from streptomycin culture broth by first treating the broth with activated charcoal at an acid pH, in the manner fully disclosed in a co-pending joint application of one of the present applicants, Babson and Tishler, Serial No. 675,323, filed June 8, 1946, now Patent No. 2,521,770 issued September 12, 1950, thereby adsorbing certain impurities while leaving the streptomycin in solution; and then, after filtering off and washing the charcoal, adjusting the pH of the combined filtrate and washings to about 8 to 11, preferentially adsorbing streptomycin on activated charcoal, and working up the charcoal adsorbate in the manner above mentioned.

Regarded in certain of its broader aspects, the novel process of the present invention comprises alkalizing an aqueous streptomycin solution to a pH of about 8 to 11, treating the alkaline solution thus formed with activated charcoal, filtering off the activated charcoal and adsorbed streptomycin, and recovering purified streptomycin from the charcoal by elution with a dilute aqueous solution of a strong non-oxidizing acid.

In carrying out the process of the present invention, the aqueous streptomycin solution can be adjusted to a pH of 8 to 11, and preferably to a pH of about 9.5 to 11, by addition of an alkali or alkaline earth metal hydroxide. Any of the common alkalies such as sodium, potassium, barium, and calcium hydroxides and the like can be used.

The alkaline solution is then filtered and the filtrate is treated with about 1 to 5% of activated charcoal, the higher percentage of charcoal being used with solutions having higher concentrations of streptomycin. After thorough stirring, the charcoal-streptomycin adsorbate is filtered off and washed with water, aqueous-alcohol, or the like until the pH of the washes is about 7.0 to 7.5. This generally requires a volume of water equal to about one-fourth the volume of filtrate. If calcium or barium hydroxide was used in alkalizing the original solution, the excess metal ions are now preferably precipitated by suspending the charcoal in water, adjusting the pH to 6.0 with sulfuric acid, and filtering.

The charcoal adsorbate is then slurried with a lower aliphatic alcohol, filtered, suspended in water, and eluted by adjusting the pH to about 2 to 3 with a strong non-oxidizing acid. Mineral acids such as hydrochloric acid and sulfuric acid as well as lower aliphatic carboxylic acids, i. e., formic, acetic, propionic, and the like, can be used.

for this purpose. The charcoal is then filtered off and the filtrate, containing streptomycin in solution, is concentrated to a small volume by heating in vacuo at about 50° C. If a mineral acid is used in elution, it is preferable, before concentration, to neutralize the solution to pH 6.0 to 6.6. This can be done by adding alkali or preferably by treating the solution with an ion exchange resin.

The concentrate is dissolved in methanol, and streptomycin is precipitated from the resulting solution by addition of acetone, the ratio of acetone to methanol being about 10 to 1 (by volume). The precipitate is separated by centrifuging, washing with fresh acetone, and drying in vacuo.

Streptomycin, isolated from aqueous solution by adsorption at an alkaline pH as above described, has a potency at least 50 to 60% higher than the potency obtainable by adsorption at neutrality followed by acid elution in accordance with the former methods above mentioned.

While products having potencies enhanced to about the same degree are obtained by treatment of streptomycin solution with activated charcoal under acidic conditions according to the disclosure of the co-pending application of Babson and Tishler, above mentioned, it is found that even higher potencies can be obtained by a combined process in which an aqueous streptomycin solution is first subjected to the acid treatment and then treated at an alkaline pH to adsorb streptomycin. In this combined process, the streptomycin culture broth, or other aqueous streptomycin solution is adjusted to a pH of about 2.2 using a strong non-oxidizing acid. The acid solution is then stirred with about 1 to 5% of activated charcoal for about 15 minutes, and the charcoal with adsorbed impurities is filtered off and washed with water. The combined filtrate and washes are adjusted to a pH of about 8 to 11 by addition of alkali and worked up in the manner already described.

As different grades of charcoal, and for that matter different batches of the same grade, differ considerably in activity, it will be understood that the amount of charcoal required, within the ranges specified, will depend upon the activity of the particular charcoal available. It will also be understood that the per cent by weight of charcoal can also be expressed in terms of weight per volume of solution. Thus 2% by weight of charcoal is approximately equivalent to 20 g. per liter of solution.

The advantages of the new purification procedure are demonstrated in the following examples, which are given by way of illustration and not of limitation.

EXAMPLE I

Former procedure 1000 cc. of streptomycin culture broth (activity 121 U./cc.) was filtered, and to the filtrate was added 20 g. of activated charcoal (Darco G-60). After thorough mixing the charcoal was filtered off and the filter cake was washed with about 500 cc. of water, and then slurried in 75 cc. of ethanol. The slurry was filtered and adsorbed streptomycin was eluted from the charcoal by mixing the charcoal with about 100 cc. of water, treating the mixture with 1.0 to 3.0 cc. of 88% formic acid until the pH remained constant at 2.2, and filtering. The filtered eluate was concentrated to 1-2 cc. in vacuo at 50° C. The streptomycin concentrate was dissolved in 5 cc. of methanol and to this solution was added 50 cc. of acetone causing formation of a precipitate. The precipitate was separated by centrifuging, washed with two 10 cc. portions of acetone, and dried in vacuo yielding 0.52 g. of product having an activity of 143 U./mg. (Overall recovery of activity equals 62%.)

EXAMPLE II

New procedure 2000 cc. of streptomycin culture broth (activity 72 U./cc.) was adjusted to pH 9.5 with barium hydroxide and filtered. The cake was washed with 200 cc. of water and the combined filtrate and washes were treated with 30 g. of activated charcoal (Darco G-60). The charcoal was filtered and washed with 500 cc. of water. The charcoal adsorbate was then suspended in about 200 cc. of water and the pH was adjusted to 6.0 with sulfuric acid to precipitate excess barium ions as barium sulfate and the charcoal was again filtered off. The charcoal was then slurried with about 200 cc. of methanol, filtered, and suspended in about 200 cc. of water. The pH of this suspension was adjusted to about 3.0 with 2.5 N hydrochloric acid. After thorough mixing of the acidic suspension, the charcoal was filtered off and the eluate was neutralized to pH 6.0-6.5 with an ion exchange resin of the basic type. After removal of the resin by filtration, the neutralized solution was concentrated to 1-2 cc. by heating at about 50° C. in vacuo. The concentrate was then dissolved in methanol, acetone was added, and streptomycin precipitated and dried as described in Example I, yielding 0.41 g. of product having an activity of 264 U./mg. (Overall recovery of activity from culture broth equals 76%.)

EXAMPLE III

New procedure 0.37 g. of partially purified streptomycin having an activity of 232 U./mg. was dissolved in 100 cc. of water and the pH was adjusted to 11.0 by addition of 30% sodium hydroxide. After filtration the solution was treated with about 5.0 g. of activated charcoal (Darco G-60). The charcoal suspension was thoroughly stirred and then filtered and washed with water until the pH of the washes was 7.0-7.5, about 50-100 cc. of water being used. The charcoal-streptomycin adsorbate was then suspended in about 20 cc. of water and the streptomycin was eluted and isolated in the manner described in Example I, yielding 0.16 g. of product having an activity of 474 U./mg. (Recovery of activity equals 88%.)

EXAMPLE IV

New combined procedure 2000 cc. of streptomycin culture broth having an activity of 77 U./cc. was adjusted to pH 2.2 with 85% phosphoric acid and stirred for 15 minutes with 40 g. of activated charcoal (Darco G-60). The charcoal was filtered and washed with 250 cc. of water. The filtrate and washes were combined and alkalized to pH 10.5 with 30% sodium hydroxide. The small amount of flocculent precipitate which separated was removed by filtration. The alkaline filtrate was treated with 5.0 g. of activated charcoal (Darco G-60) and filtered. The charcoal was washed with water until the pH of the washes was about 7.0-7.5. The charcoal-streptomycin adsorbate was suspended in about 200 cc. of water and the streptomycin was eluted with formic acid and isolated in the manner described in Example I, yielding .20 g. of product having an activity of 373 U./mg. (Overall recovery of activity equals 51%.)

EXAMPLE V

Former procedure 2000 cc. of the same streytomycin culture broth as used in Example IV was filtered, treated with activated charcoal at neutrality, and worked up to isolate streptomycin following the same procedure as in Example I. This yielded .56 g. of product having an activity of 143 U./mg. (Overall recovery of activity equals 52%.)

Modifications of the foregoing procedures can be made without departing from the spirit and scope of the present invention, and we are to be limited only by the appended claims.

We claim:

1. The process that comprises alkalizing an aqueous streptomycin solution to a pH of more than 9.5, treating the alkaline solution thus formed with activated charcoal, filtering off the charcoal-streptomycin adsorbate, washing the adsorbate to neutrality, and recovering purified streptomycin from the adsorbate by elution with a dilute aqueous solution of a strong non-oxidizing acid.

2. The process that comprises alkalizing a streptomycin culture broth to a pH of more than 9.5, treating the alkaline solution thus formed with activated charcoal, filtering off the charcoal-streptomycin adsorbate, washing the adsorbate to neutrality, and recovering purified streptomycin from the adsorbate by elution with a dilute aqueous solution of a strong non-oxidizing acid.

3. The process that comprises alkalizing an acidic streptomycin solution, obtained by acid-charcoal treatment of an aqueous streptomycin solution, to a pH of more than 9.5, treating the alkaline solution thus formed with activated charcoal, filtering off the charcoal-streptomycin adsorbate, washing the adsorbate to neutrality, and recovering purified streptomycin from the adsorbate by elution with a dilute aqueous solution of a strong non-oxidizing acid.

4. In the purification of streptomycin, the steps that comprise adjusting the pH of an aqueous streptomycin solution to about 9.5 to 11 by addition of alkali, filtering off any precipitate thus formed, treating the alkaline solution with 1 to 5% of activated charcoal, filtering off the charcoal-streptomycin adsorbate and washing to neutrality, and recovering purified streptomycin from the adsorbate by elution with a dilute aqueous solution of a strong non-oxidizing acid.

WILLIAM A. BITTENBENDER.
ROBERT D. BABSON.

REFERENCES CITED

The following references are of record in the file of this patent:

UNITED STATES PATENTS

| Number | Name | Date |
|---|---|---|
| 2,422,230 | Foster et al. | June 17, 1947 |
| 2,501,014 | Wintersteiner et al. | Mar. 21, 1950 |

OTHER REFERENCES

Waksman et al., J. Am. Pharm. Assoc. (Sci. Ed.), vol. 34 (November 1945), pages 273–279.

Quarendon, Manuf. Chemist and Manuf. Perfumer, vol. 14 (1943), pages 251–254.

Coghill, Monthly Progress Report #10 (March 1, 1943), 3 pages.

Cutter Laboratories, "Penicillin Chemical Processing" Progress Report to June 15, 1944 (Cu-1), pages 1, 9, and 10.